United States Patent [19]
Garnjost et al.

[11] Patent Number: 4,597,322
[45] Date of Patent: Jul. 1, 1986

[54] SEAL ASSEMBLIES

[75] Inventors: Kenneth D. Garnjost, Buffalo; David J. Flavell, East Aurora, both of N.Y.

[73] Assignee: Moog Inc., East Aurora, N.Y.

[21] Appl. No.: 662,967

[22] Filed: Oct. 19, 1984

Related U.S. Application Data

[63] Continuation-in-part of Ser. No. 569,183, Jan. 9, 1984, abandoned.

[51] Int. Cl.⁴ ............................ F16J 15/52; F16J 15/56
[52] U.S. Cl. ............................................ 92/60; 92/80; 92/82; 92/86; 92/166; 92/167; 92/168
[58] Field of Search ............... 92/168 B, 86, 40, 108, 92/101, 65, 63, 60, 80, 82, 162, 166, 167; 277/27, 3, 8, 93 SD, 138, 200; 91/451, 452, 468

[56] References Cited

U.S. PATENT DOCUMENTS

| | | | |
|---|---|---|---|
| 3,101,219 | 8/1963 | Herrera | 92/63 |
| 3,107,583 | 10/1963 | Woodward | 92/63 |
| 3,293,994 | 12/1966 | Napolitano | 92/86 |
| 3,768,371 | 10/1973 | Orme | 92/86 |
| 3,972,396 | 8/1976 | Bochnak | 92/86 |

Primary Examiner—Robert E. Garrett
Assistant Examiner—Mark A. Williamson
Attorney, Agent, or Firm—Sommer & Sommer

[57] ABSTRACT

A seal assembly is arranged to contain leakage of hydraulic fluid passing between a wall opening and a penetrant rod portion passing through the opening. The seal assembly includes a sliding-seal member mounted on a portion of the rod for sliding movement toward and away from an abutment surface and a non-sliding flexible-seal member arranged between the body and the sliding-seal member. The body, flexible-seal member, sliding-seal member and rod define a sealed chamber into which such fluid will leak. The chamber communicates with a fluid reservoir through a oneway check valve. The sliding-seal and flexible-seal members are arranged in parallel with one another. In one embodiment, a spring urges the sliding-seal member to move toward an abutment surface provided on the rod. In another embodiment, movement of the sliding-seal member relative to the body is limited by facing abutment steps.

24 Claims, 8 Drawing Figures

SEAL ASSEMBLIES

CROSS REFERENCE TO RELATED APPLICATION

This application is a continuation-in-part of our prior pending U.S. Pat. application Ser. No. 569,183, filed Jan. 9, 1984, now abandoned entitled "Seal Assembly".

BACKGROUND OF THE INVENTION

1. Field of the Invention

The present invention relates generally to the field of seal members, and, more particularly, to an improved seal member which is adapted to contain leakage of fluid passing from a pressurized chamber between a wall opening and a penetrant rod portion passing therethrough.

2. Description of the Prior Art

Many forms of fluid-powered actuators have been heretofore developed. The most common of these has a piston slidably mounted within a cylinder. A rod typically penetrates an end wall of the cylinder and is connected to the piston, such that the piston and rod move together as a unit. Generally, the portion of the rod which is arranged within the piston end chamber will be exposed to a pressure greater than the distal end of the rod, which is arranged on the other side of the wall penetrated by the rod. Because of the pressure differential which may be encountered across such wall, fluid will tend to leak from the piston end chamber between the wall opening and the penetrant portion of the rod passing therethrough. It has been known to provide resilient seals between the rod and the wall opening to substantially reduce the amount of fluid leakage therebetween. It has also been known to provide a closely-fitted rod through a wall opening having certain axially-spaced grooves in the marginal portion about the opening. This is known as a "laminar seal" because it has the characteristics of relatively-low, laminar leakage, and has a very long life.

However, in some situations, the actuator rod must operate in a cyclical or harmonic manner over long periods of time. In these applications, it would be desirable that the rod seal have an extremely long endurance life and substantially zero leakage. Typical elastomeric or plastic seals will not afford the required life, and closely-fitted, lapped, metal-to-metal seals, which can meet the life requirements, typically exhibit unacceptable rates of leakage.

SUMMARY OF THE INVENTION

The present invention provides an improved seal assembly, which combines the long-life attributes of a laminar seal with the low-leakage characteristics of a resilient seal, for use in a fluid-powered actuator having a body and a rod. The body has a portion configured as a wall. The rod has an inner portion arranged on one side of the wall, an intermediate portion passing through an opening in the wall, and an outer portion arranged on the other side of the wall.

The improved seal assembly is adapted to contain fluid leaking between the wall opening and the penetrant portion of the rod passing therethrough, and broadly includes: a first abutment surface on one of the body and rod; a sliding-seal member mounted on the rod outer portion for sealed sliding movement therealong toward and away from the first abutment surface; a flexible-seal member joining the body and sliding-seal member, and defining with the body, the sliding-seal member and the rod outer portion, a sealed leakage chamber communicating with the wall opening; and a valve operatively arranged to relieve excess pressure within the chamber.

In one form, the first abutment surface is provided on the rod, and a spring is arranged to urge the sliding-seal member to move toward the first abutment surface. In another form, first and second abutment surfaces are provided on the body, and the sliding-seal member is constrained to move between them.

Viewed from another perspective, the invention provides an improved fluid seal for a reciprocating actuator, which includes the combination of a non-sliding flexible-seal member, arranged in parallel with a pre-load sliding-seal mounted on an actuator rod, and means for permitting relative motion of the sliding-seal relative to the actuator rod only when the fluid pressure exceeds the working capability of the flexible-seal.

Accordingly, the general object of the present invention is to provide an improved seal assembly.

Another object is to provide an improved seal assembly for containing leakage between an opening through a pressurized chamber end wall and a penetrant portion of a rod passing therethrough.

Another object is to provide an improved seal assembly for a fluid-powered actuator, which must be operated cyclically with a minimum amount of fluid leakage loss.

These and other objects and advantages will become apparent from the foregoing and ongoing written specification, the drawings, and the appended claims.

DESCRIPTION OF THE PREFERRED EMBODIMENTS

Figure 1:
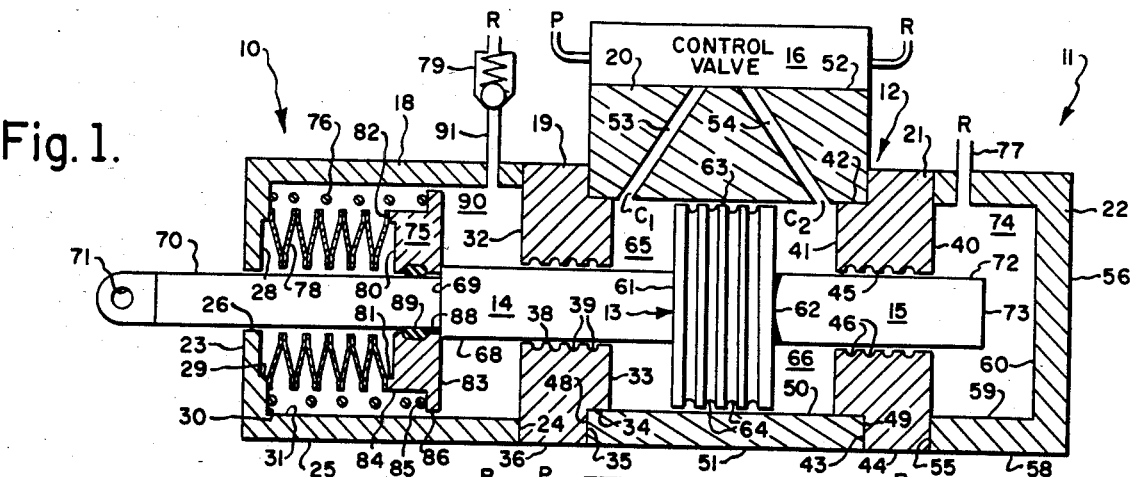
FIG. 1 is a schematic fragmentary vertical sectional view of a fluid-powered actuator incorporating a first embodiment of the improved seal assembly, this view showing the actuator piston as being in a position centered between the two end walls of the chamber.

At the outset, it should be clearly understood that like reference numerals are intended to identify the same structural elements, portions or surfaces consistently through the several drawing figures, as such elements, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered a portion of the entire "written description" of this invention, as required by 35 U.S.C. §112. As used in the following description, the terms "left", "right", "up" and "down", as well as adjectival and adverbial derivatives thereof (i.e., "leftwardly", "rightwardly", etc.), refer to the orientation of structure as a particular drawing figure faces the reader. Similarly, the terms "inwardly" and "outwardly" refer to the orientation of a surface relative to its axis of elongation.

FIRST EMBODIMENT (FIGS. 1-4)

Referring now to the drawings, and, more particularly, to FIG. 1, thereof, this invention provides an improved seal assembly, of which a first embodiment is generally indicated at 10, for use in a fluid-powered actuator, one example of which is generally indicated at 11.

Actuator 11 is shown as broadly including a body 12 having a chamber therewithin, a piston 13 slidably mounted in the chamber for axial sliding movement therealong, a first rod 14 extending leftwardly from the piston and penetrating one chamber end wall, a second rod 15 extending rightwardly from the piston and penetrating a second chamber end wall, and a control valve 16.

More particularly, body 12 is shown as being a horizontally-elongated member of sectional construction, and includes (from left to right in FIG. 1) a leftward part 18, a first end wall member 19, an intermediate part 20, a second wall end member 21, and a rightward part 22.

The body left part 18 is specifically bounded by: an annular vertical left end face 23; an annular vertical right end face 24; a cylindrical outer surface 25 extending between the end faces; and an inner surface which sequentially includes an inwardly-facing cylindrical surface 26 extending rightwardly from left end face 23, a rightwardly-facing annular vertical surface 28, an inwardly-facing cylindrical surface 29, a rightwardly-facing annular vertical surface 30, and an inwardly-facing cylindrical surface 31 continuing rightwardly therefrom to join right end face 24. Surfaces 28 and 29 form a coaxial annular recess within the body left part.

The first end wall member 19 is shown as being a horizontally-thickened annular disc-like member, and is bounded by: an annular vertical left face 32; a stepped right face, which sequentially includes a central rightwardly-facing annular vertical surface 33, an outwardly-facing cylindrical surface 34 extending leftwardly therefrom, and a rightwardly-facing annular vertical surface 35 continuing radially outwardly therefrom; a cylindrical outer surface 36 joining surfaces 32,35; and an inwardly-facing cylindrical surface 38 extending between surfaces 32,33. The outer margin of left face 32 is arranged to abut the right face 24 of body left part 18. Surfaces 34,35 form an annular recess extending leftwardly into the first end wall member. A plurality of axially-spaced annular grooves, severally indicated at 39, extend radially into the first end wall member from its inner surface 38 to balance the fluid pressure about the penetrant portion of rod 14. Thus, the opening through the body first wall member is bounded by a surface which has a series of alternating lands and grooves.

The body second end wall member 21 is substantially a mirror image of the first end wall member 19, previously described. Specifically, member 21 includes an annular vertical right end face 40; a stepped left face, which sequentially includes a central leftwardly-facing annular vertical surface 41, an outwardly-facing cylindrical surface 42 extending rightwardly therefrom, and a leftwardly-facing vertical surface 43 continuing outwardly therefrom; a cylindrical outer surface 44 extending between surfaces 40,43; and a coaxial inwardly-facing cylindrical surface 45 extending between surfaces 40,41. Surfaces 42,43 form an annular recess extending rightwardly into the second end wall member. A plurality of axially-spaced annular grooves, severally indicated at 46, extend radially into the second end wall member from its inner surface 45. As with the first end wall member, the opening through this second end wall member is bounded by an alternating series of lands and grooves.

The body intermediate part 20 is shown as being a horizontally-elongated, specially-configured, somewhat-tubular member, the upper portion of which is shown as being radially thickened. Specifically, the intermediate part has annular vertical left and right end faces 48,49, respectively, and a cylindrical inner surface 50 extending therebetween. The leftward annular corner adjacent the intersection of surfaces 48,50 is received in the rightwardly-facing recess of the first end wall member between surfaces 34,35. Similarly, the rightward annular corner adjacent the inner section of surfaces 49,50 is received in the leftwardly-facing recess of the second end wall member between surfaces 42,43. The exposed central portion of cylindrical surface 50, which is not covered by surfaces 34 or 42, forms the side wall of a chamber within the assembled body. Surfaces 33 and 41 form the left and right end walls, respectively, of this chamber. The outer surface of the body intermediate member 20 is specially-configured, and may include a lowermost cylindrical surface portion 51, and an uppermost horizontal planar portion 52 to accommodate mounting the control valve 16 thereon. To this end, the radially-thickened upper portion is shown as being provided with two passageways 53,54 communicating upper surface 52 with inner surface 50 adjacent end walls 33,41, respectively. These passageways are provided to permit fluid to pass between the control valve and the two end chambers on either side of the piston.

The body rightward part 22 is depicted as being a somewhat cup-shaped member, and has an annular vertical left face 55 arranged to abut an outer margin of second end wall member surface 40; a circular vertical right face 56; a cylindrical outer surface 58 extending between faces 55,56; and an inner surface which includes an inwardly-facing cylindrical surface 59 extending rightwardly from left face 55, and a leftwardly-facing circular vertical bottom surface 60.

The piston 13 has annular vertical left and right faces 61,62, respectively, and a closely-lapped cylindrical outer surface 63 which is arranged to slidably engage the exposed cylindrical inner wall 50 of the chamber. The piston outer surface is provided with a plurality of axially-spaced annular grooves, severally indicated at 64. If desired, one or more O-Rings (not shown), or equivalent, could be arranged between the piston and cylinder. The presence of the piston subdivides the chamber into a left fluid chamber 65 (between surfaces 33,61), and a right fluid chamber 66 (between surfaces 41,62).

The first rod 14 extends axially leftwardly from the piston left face 61. Specifically, rod 14 is a horizontally-elongated solid member having an outer surface which is bounded by (from right to left): an outwardly-facing cylindrical surface 68, closely fitted to cylindrical surface 38, extending leftwardly from piston face 61 and having a portion penetrating first wall opening 38; a leftwardly-facing annular vertical shoulder or abutment surface 69; an outwardly-facing cylindrical surface 70 continuing leftwardly therefrom and terminating in an eye 71, by which the rod may be readily connected to other structure (not shown). Rod 14 may be regarded as having a rightward "inner" portion arranged within fluid chamber 65 (i.e., between wall surface 33 and piston face 61), an "intermediate" portion passing through or penetrating first end wall member inner surface 38, and a leftward "outer" portion arranged on the other side of the first wall member (i.e., leftwardly of surface 32). Of course, the axial lengths of rod "inner" and "outer" portions will depend upon the position of the rod-piston-rod subassembly relative to the body at any point in time. However, the length of the rod cylindrical surface 68 is such that the abutment surface 69 will always remain to the left of body surface 32.

The second rod 15 extends axially rightwardly from piston right face 62. Rod 15 is bounded by an outwardly-facing cylindrical surface 72, closely fitted to cylindrical surface 45, a portion of which passes through the second wall opening 45, and has a circular vertical right end face 73. Rod 15 may be regarded as having a leftward "inner" portion arranged within chamber 66 (i.e., between surfaces 41,62) and "intermediate" portion passing through second wall opening 45, and a rightward "outer" portion (i.e., between surfaces 40,73) arranged within the body rightward part 22. Of course, the axial lengths of the "inner" and "outer" portions of rod 15 will depend upon the position of the rod-piston-rod subassembly relative to the body at any point in time. Chamber 74 within the body right part is vented to a fluid return (R) or reservoir through a conduit 77.

The control valve 16 may be, but is not limited to, an electrohydraulic servovalve of the type disclosed in U.S. Pat. No. 3,023,782, the aggregate disclosure of which is hereby incorporated by reference insofar as the structure and operation of such valve is concerned. Valve 16 is adapted to receive pressurized fluid from a suitable source (P), is connected to a fluid return (R), and is arranged to supply control pressures ($C_1$, $C_2$) to chambers 65,66, respectively. Such fluid will normally be, but is not limited to, a suitable liquid, such as oil, which may be regarded as being substantially incompressible. An electrical signal may be supplied to valve 16 to selectively produce the desired control pressure ($C_1$, $C_2$) in fluid chambers 65,66, the differential of which (when it exists) may be used to exert a net force on the rod-piston-rod subassembly which urges it to move in the appropriate axial direction relative to the body. Thus, either of chambers 65 and 66 may sometimes be pressurized positively relative to the pressure of the fluid return (R). At other times, these chambers may severally communicate with the return.

As a practical matter, there will always be some leakage of fluid from chamber 65, when positively pressurized, between the "intermediate" portion of rod 14 and wall opening 38. This is particularly so if the actuator is caused to operate cyclically or harmonically over a long period of time. The purpose of the improved seal assembly is to contain such leakage without substantially interfering with the movement of the rod-piston-rod subassembly relative to the body.

To this end, the improved seal assembly 10 includes an abutment surface 69 on rod 14, as previously described; a sliding-seal member 75; a resilient member 76; a flexible seal member 78; and a valve 79.

Seal member 75 encircles the cylindrical surface 70 of the "outer" portion of rod 14, and is mounted for sealed sliding movement therealong toward and away from abutment surface 69. The sliding-seal member is shown as having a stepped left face, which includes a leftwardly-facing central annular vertical surface 80, an inwardly-facing cylindrical surface 81 extending leftwardly therefrom, and a leftwardly-facing outer annular vertical surface 82; an annular vertical right face 83; a stepped outer surface which includes an outwardly-facing cylindrical surface 84 extending rightwardly from surface 82, a leftwardly-facing annular vertical shoulder surface 85, and an outwardly-facing cylindrical surface 86 continuing rightwardly therefrom to join right face 83; and an inwardly-facing cylindrical surface 88 which is arranged to face and slidably engage rod surface 70. An annular recess extends into the sliding-seal member from its inner surface 88 to accommodate the presence of a sealing O-Ring 89, which compressibly engages rod surface 70.

The resilient member 76 is a coil spring having its left end engaging body surface 30 and having its right end engaging sliding-seal member surface 85. Spring 76 is in compression, and continuously urges the sliding-seal member to move rightwardly, relative to the rod, toward abutment surface 69.

The flexible seal member 78 is in the form of an accordion-like metal bellows, having one marginal end portion suitably secured to body surface 30 and having its other marginal end portion secured to the sliding-seal member surface 82.

The valve 79 is shown as being a one-way check valve, which continuously communicates with the annular sealed leakage chamber 90 through a conduit 91 penetrating the leftward body part. Specifically, leakage chamber 90 is bounded by the outside of bellows 78, body surfaces 30,31 and 32, a portion of the "outer" surface of rod 14, and sliding-seal member 75. Valve 79 is arranged to permit pressurized fluid to exit chamber 90 to return, but to prevent fluid from flowing from the return into chamber 90.

Assume that leakage chambers 90,74, as well as piston end chambers 65,66 are intially filled with a suitable hydraulic fluid.

Figure 2:
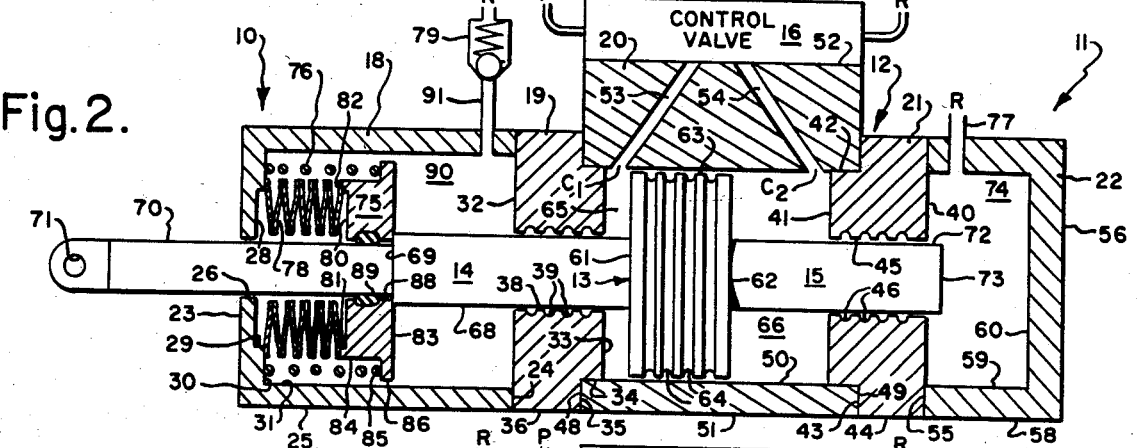
FIG. 2 is a view similar to FIG. 1, but showing the piston as having been displaced from the centered position shown in FIG. 1, leftwardly toward the chamber left end wall.
Figure 3:
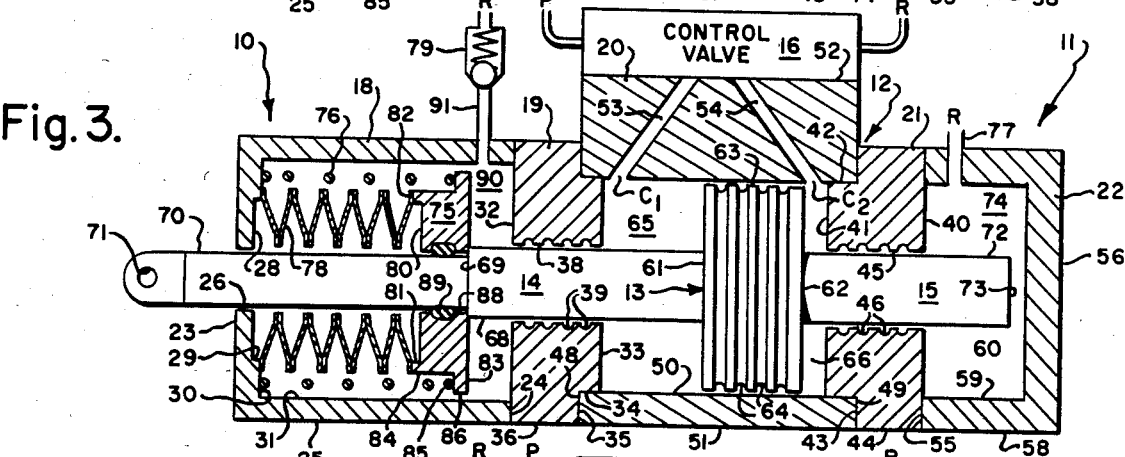
FIG. 3 is a view similar to FIG. 1, but showing the actuator piston as having been displaced from the centered position shown in FIG. 1, rightwardly toward the chamber right end wall.
Figure 4:
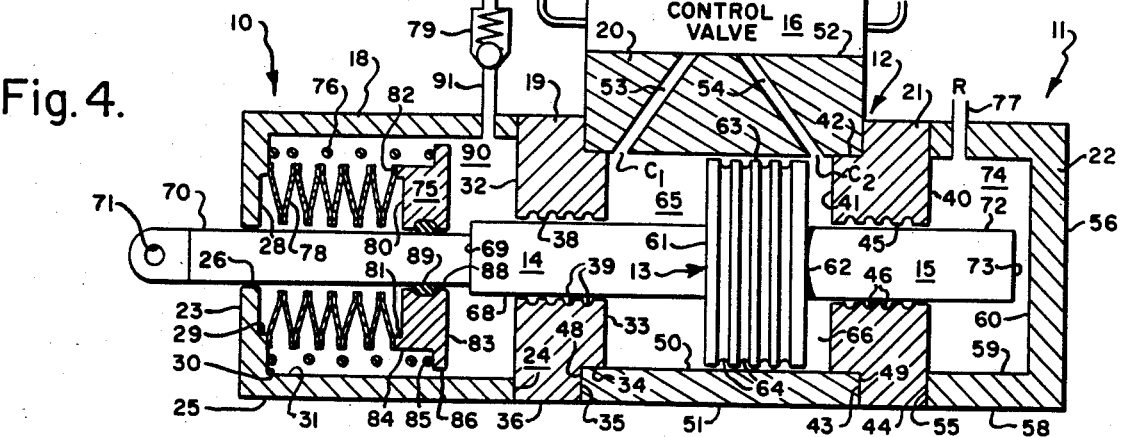
FIG. 4 is a view similar to FIG. 3, but showing the sliding-seal member as having moved axially leftwardly relative to the rod, away from the abutment surface.

Assume that the control valve is now operated to cause the rod-piston-rod subassembly to move cyclically horizontally back and forth relative to the body. The right leakage chamber 74 is in continuous communication with the fluid return (R). Hence, when rod 15 moves rightwardly from the centered position shown in FIG. 1 to the position shown in FIG. 3, fluid will be forced out of chamber 74 through conduit 77 to return. When rod 15 reverses its stroke and moves leftwardly toward the position shown in FIG. 2, fluid may be drawn back into chamber 74 if the return line is completely filled with fluid. If not, air may be drawn into chamber 74 during such leftward return stroke. Of course, any fluid leaking from chamber 66 between the "intermediate" portion of rod 15 and second wall opening 45 will enter right leakage chamber 74, thereby tending to replace that which has previously left through line 77.

If the pressure in piston left chamber 65 is greater than the pressure in leakage chamber 90, any fluid leaking between the intermediate portion of rod 14 and first wall opening 38 will flow into chamber 90. This will usually be the case since excess pressure in chamber 90 is permitted to flow through check valve 79 to return (R). However, conduit 91 and check valve 79 pose certain restrictions to such flow. If the rod-piston-rod assembly is caused to move to the right, the volume in chamber 90 will be reduced by expansion of the bellows and the fluid pressure in chamber 90 will increase. If such pressure increases sufficiently, the sliding-seal member and bellows will lag behind such rightward movement of the rod-piston-rod to prevent the pressure in chamber 90 from increasing to a level which might otherwise damage the bellows. In other words, while the coil spring continuously urges the sliding-seal member to engage the abutment surface 69, the invention permits the rod-piston-rod assembly to move rightwardly relative to the body, and allows independent relative motion between the sliding-seal member and the rod if the pressure in chamber 90 becomes too high. Thus, if the rod-piston-rod subassembly moves quickly to the right, the pressure in chamber 90 will rapidly rise. When the leftward force, exerted by such pressure on the net or effective area of the sliding-seal member, exceeds the opposing rightward force exerted by the spring, the sliding-seal member may move slidably along rod 14 away from abutment surface 69. This feature of allowing the sliding-seal member to move relative to the rod, functions to prevent the pressure in chamber 90 from increasing to a level which might damage the bellows. Indeed, if the pressure in chamber 90 were to continue to rise, sliding-seal member 75 would move leftwardly until the bellows would be tightly compressed, and therefore be in its strongest position to resist the effect of such pressure. During normal operation, however, the pressure increase in chamber 90 is vented to return through valve 79. The movement of the sliding-seal member along rod 14 away from abutment surface 69 will normally occur if the rod-piston-rod subassembly moves rapidly to the right and/or if the serviced hydraulic fluid is highly viscous, as when it is cold. Even so, when the excessive pressure condition is relieved, the spring will cause the sliding-seal member to again engage seat surface 69, and normal operation will thereafter resume without interruption of actuator service.

When the rod-piston-rod subassembly moves leftwardly, the fluid in chamber 90 will cavitate, thereby immediately dropping its pressure because check valve 79 prevents fluid from flowing back into chamber 90. During a rapid reversal of the stroke, some rightward motion of the rod could be immediately accommodated by the extent of past cavitation.

It should be noted, however, that relative motion between sliding-seal member 75 and rod 14 occurs only as a result of an abnormally high pressure in chamber 90, as may normally occur with transient motion of the rod-piston-rod subassembly or during cold, start-up conditions when the serviced fluid is highly viscous. During normal, steady-state operation of the actuator, such relative motion between the rod and the sliding-seal member does not occur, so that the cyclical life of the actuator is not limited by wear of the elastomeric seal, such as would occur if a comparable seal were used between surfaces 38 and 68.

SECOND EMBODIMENT (FIGS. 5-8)

Since the structure of the second embodiment contains many elements, portions or surfaces in common with the structure heretofore described, the corresponding elements, portions or surfaces of the second embodiment will be identified by the prime of the same reference numerals previously used, without further specific discussion. The purpose of this is to enable the reader to focus on the differences between the two embodiments.

Thus, referring now to FIGS. 5-8, a second embodiment of the improved seal assembly, generally indicated at 10', is shown in association with another fluid-powered actuator 11'. However, in the second embodiment, the abutment surface 69 on rod 14 has been eliminated, and rod 14' has an outer cylindrical surface 68' extending leftwardly from piston left end face 61' to rod eye 71'. Spring 76 has also been eliminated from the second embodiment.

The principal differences between the two embodiments is that the body left part 18' is shown as being radially-thickened, to accommodate the provision of an annular recess which extends radially into the body left part from surface 31'. Specifically, this recess is bounded by: a rightwardly-facing annular vertical surface 92' extending radially outwardly into body left part from its cylindrical surface 31', a cylindrical surface 93' continuing horizontally and rightwardly therefrom, and a leftwardly-facing annular surface 94' extending radially therefrom to rejoin body part surface 31'. Body part surfaces 92', 94' provide limit stops for movement of the sliding-seal member 75' relative to the body.

Figure 7:
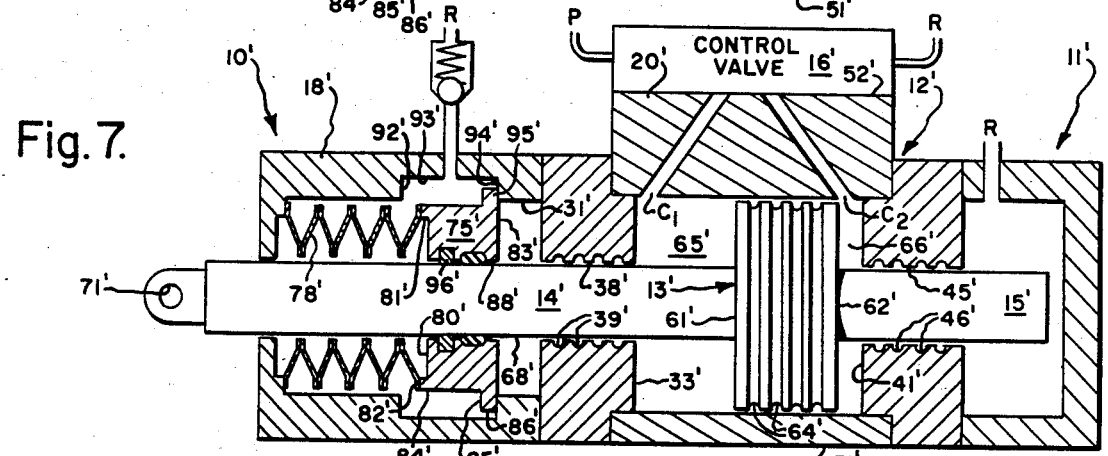
FIG. 7 is a view similar to FIG. 5, but showing the piston as having been displaced rightwardly from the centered position shown in FIG. 5, toward the chamber right end wall, with the sliding-seal member abutting another body surface.
Figure 8:
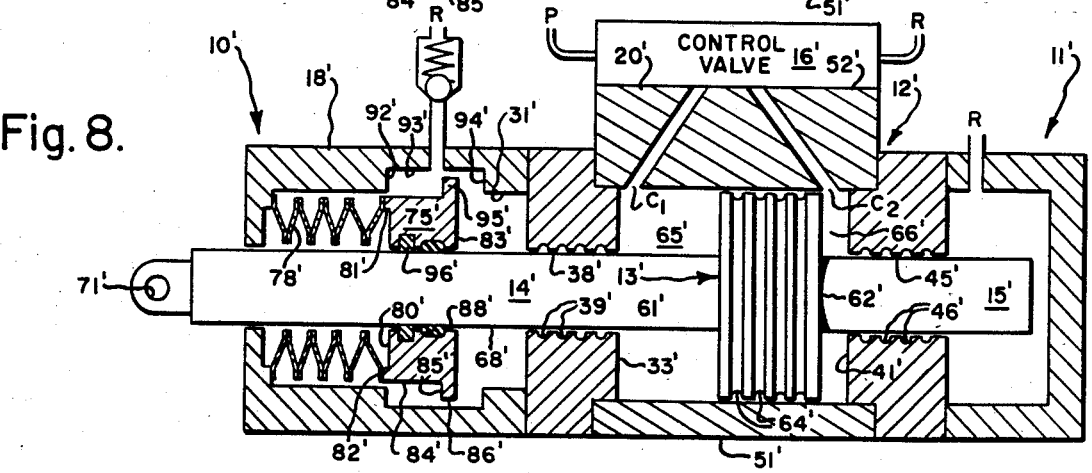
FIG. 8 is a view similar to FIG. 7, but showing the sliding-seal member as having moved leftwardly, and relative to the temporarily-fixed position of the rod, and away from such other body surface.

The sliding-seal member 75' has the same general appearance as in the first embodiment, although it is differently dimensioned. Specifically, the sliding-seal member has a stepped left face, which includes a leftwardly-facing central annular vertical surface 80', an inwardly-facing cylindrical surface 81' extending leftwardly therefrom, and a leftwardly-facing outer annular vertical surface 82'; an annular vertical right face 83'; a stepped outer surface which includes an outwardly-facing cylindrical surface 84' extending rightwardly from 82', a leftwardly-facing annular vertical surface 85', and an outwardly-facing cylindrical surface 86' continuing rightwardly therefrom to join right end face 83'; and an inwardly-facing cylindrical surface 88'which is arranged to face and slidably engage rod surface 68'. However, the portion of the sliding-seal member between surfaces 85', 83' forms an outwardly-extending annular lug 95' which is positioned in the body recess. Thus, the sliding seal member 75' may move leftwardly relative to rod 14 until lug left surface 85' abuts body part surface 92' (FIG. 6), or rightwardly until its right face 83' abuts body part surface 94' (FIG. 7). Moreover, an annular recess, having a rectangular cross section, extends radially into the sliding-seal member 75' to accommodate the presence of a friction member 96', which frictionally engages rod surface 68' and tends to inhibit or restrain relative sliding movement between the sliding seal member and the rod. As previously noted, spring 76 has been eliminated from the second embodiment.

Figure 5:
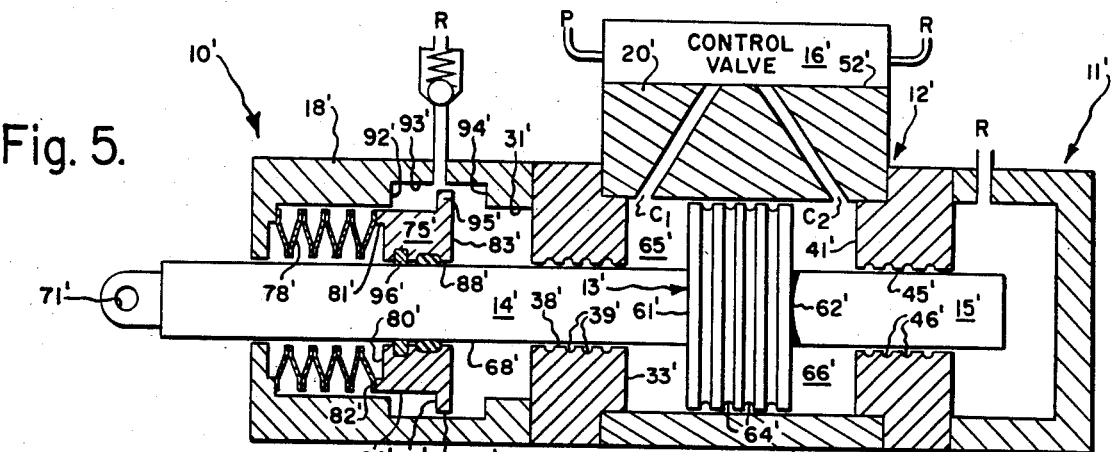
FIG. 5 is a schematic fragmentary vertical sectional view of a fluid-powered actuator incorporating a second embodiment of the improved seal assembly, this view showing the actuator as being in a position centered between the two end walls of the chamber.
Figure 6:
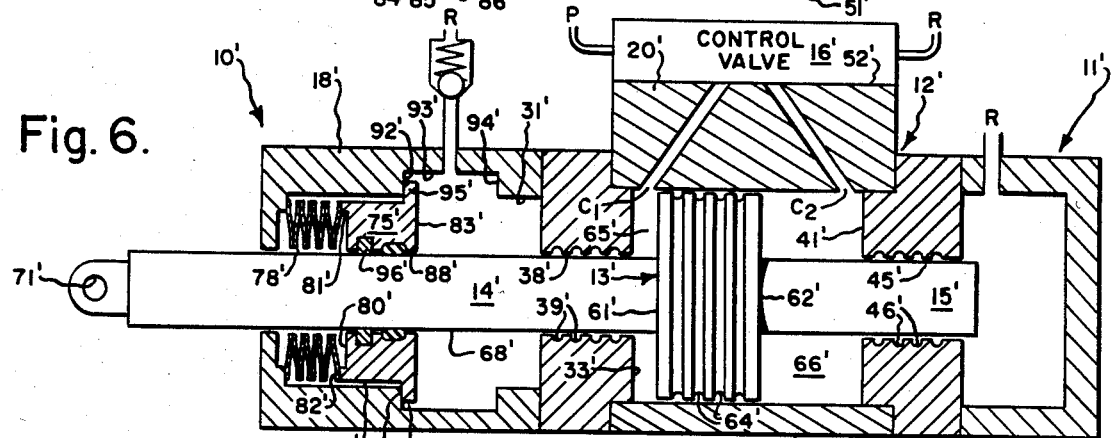
FIG. 6 is a view similar to FIG. 5, but showing the piston as having been displaced leftwardly from the centered position shown in FIG. 5, toward the chamber left end wall, with the sliding-seal member abutting one body surface.

The left body part is configured such that when sliding-seal surface 85' abuts body left part surface 92', the flexible seal member, again shown as being a metal bellows 78', is in its fully compressed condition. Similarly, the body left part is further configured such that body left part surface 94' is positioned such that when it is engaged by sliding-seal member right face 83', the bellows is in a substantially fully-expanded condition. The free length of bellows 78' is substantially coincident with the mid-point position between surfaces 92', 94', as shown in FIG. 5. Therefore, when bellows 78' is at its unbiased free length, the sliding-seal member lug 95' will be located substantially equidistant body abutment surfaces 92', 94'. From this centered position relative to the body, the sliding-seal member may be moved either leftwardly to compress bellows 78', or rightwardly to expand the bellows. The friction member 96' may be set or adjusted such that the frictional forces between the sliding-seal member and the rod exceeds the maximum deflection force of the bellows or any return pressure. In this manner, when the actuator is moved through large amplitude, low-frequency excursions, the sliding seal will initially be carried by the frictional contact between the sliding seal member and rod 14, until it encounters a stop, 92' or 94', after which the rod will move relative to the sliding-seal member. High-frequency, small-amplitude excursions about any average piston position can occur through flexure of bellows 78', without any relative sliding movement between the sliding-seal member 75' and the rod. The result of this is that, over the life of the actuator, the total relative motion between the rod and the sliding-seal member will only be that which would have been caused by high-amplitude, low-frequency excursions, effectively eliminating any wear caused by the low-amplitude high-frequency excursions.

It should also be appreciated that this mechanism not only allows actuator motions in excess of the flexible-seal displacement capability, but also provides protection of the bellows from exposure of excessive pressure. If the pressure in the cavity between the flexing seal and the laminar seal exceeds the sliding friction level, relative motion between the rod and the sliding-seal will occur, and no fluid will be displaced from the cavity, thus limiting the pressure build-up. If the cavity pressure were to increase due to an elevation in the return pressure, the flexing seal could be compressed solid, thus increasing its ability to withstand high pressure.

MODIFICATIONS

The disclosed embodiments are only exemplary, and the invention contemplates that many changes and modifications may be made. For example, the body may be formed of any suitable material, and may be made integral or sectional, as desired. The configuration of the various component parts may be readily changed. The flexible member may be an accordion-like bellows, a diaphragm, or any other flexible member (metallic or non-metallic) capable of accommodating the design stroke of the actuator and containing the serviced fluid without leakage. The control valve need not necessarily be an electrohydraulic servovalve. Indeed, some other valve might be substituted therefore. The resilient member need not necessarily be a coil spring. The invention is generally useful in containing leakage between a wall opening and a penetrant rod, of whatever cross-section, not necessarily the specific form of actuator shown.

Therefore while the presently preferred embodiment of the seal assembly has been illustrated and explicitly described and several modifications thereof discussed, persons skilled in this art will readily appreciate that various additional changes and modifications may be made without departing from the spirit of the invention, as defined and differentiated in the following claims.

What is claimed is:

1. In a fluid-powered actuator having a body and a rod, said body having a portion configured as a wall, said rod having an inner portion arranged on one side of said wall, having a penetrant portion passing through an opening in said wall, and having an outer portion arranged on the other side of said wall, the improvement which comprises:

a seal assembly for containing fluid leakage between said rod penetrant portion and said wall opening, said seal assembly including a first abutment surface on one of said body and rod outer portion;

a sliding-seal member mounted on said rod outer portion for sealed sliding movement therealong toward and away from said first abutment surface; and a flexible-seal member joining said body and sliding-seal member and defining between said body, said sliding-seal member and said rod outer portion, a sealed chamber communicating with said wall opening.

2. The improvement as set forth in claim 1 wherein said first abutment surface has a component facing away from said wall.

3. The improvement as set forth in claim 2 wherein said first abutment surface is provided on said rod.

4. The improvement as set forth in claim 3 and further comprising:

a resilient member acting between said body and said sliding-seal member for urging said sliding-seal member to move toward said first abutment surface.

5. The improvement as set forth in claim 4 wherein said resilient member is a coil spring.

6. The improvement as set forth in claim 4 wherein said resilient member is arranged within said chamber.

7. The improvement as set forth in claim 4 wherein said sliding-seal member may move away from said first abutment surface when the force attributable to the pressure within said chamber exerted on said sliding-seal member exceeds the opposing force exerted on said sliding-seal member by said resilient member.

8. The improvement as set forth in claim 1 and further comprising: A valve operatively arranged to relieve excess pressure within said sealed chamber.

9. The improvement as set forth in claim 8 wherein said valve is a check valve operatively arranged to permit fluid to exit said chamber.

10. The improvement as set forth in claim 2 wherein said first abutment surface is provided on said body.

11. The improvement as set forth in claim 10 and further comprising a second abutment surface provided on said body and having a component facing toward said first abutment surface component.

12. The improvement as set forth in claim 11 wherein said sliding-seal member is mounted for movement relative to said body between said first and second abutment surface components.

13. The improvement as set forth in claim 12 wherein said flexible-seal member is movable between a fully-extended position and a fully-retracted position, and wherein said flexible-seal member is substantially in said fully-retracted position when said sliding-seal member engages said second abutment surface.

14. The improvement as set forth in claim 13 wherein said flexible-seal member has an unbaised free length, and wherein said slidable-seal member is positioned substantially half-way between said first and second abutment surfaces when said flexible-seal member is at said unbiased free length.

15. The improvement as set forth in claim 14 wherein said flexible-seal member exerts a force on said sliding-seal member which urges said sliding seal member to move relative to said rod outer portion whenever said flexible-seal member is displaced from said unbiased free length.

16. The improvement as set forth in claim 1 wherein said flexible-seal member is a bellows.

17. The improvement as set forth in claim 1 and further comprising a frictional element operatively arranged between said sliding-seal member and said rod outer portion to provide a desired level of frictional resistance to relative sliding movement between said sliding-seal member and said rod outer portion.

18. The improvement as set forth in claim 1 and further comprising: relief means for relieving excess pressure within said sealed chamber.

19. The improvement as set forth in claim 18 wherein said relief means is a valve.

20. In a fluid-powered actuator having a body and a rod, said body having a portion configured as a wall and provided with an opening therethrough, said rod having an inner portion arranged on one side of said wall, a penetrant portion passing through said wall opening, and an outer portion arranged on the other side of said wall, the improvement which comprises:
a seal assembly for containing fluid leaking between said rod penetrant portion and said wall opening, said seal assembly including
a sliding-seal member mounted on said rod outer portion for sealed sliding movement therealong, and a flexible-seal member having one end sealingly connected to said body and having another end sealingly connected to said sliding-seal member, said flexible-seal being movable within a displacement range relative to said body,
the frictional forces between said sliding-seal member and said rod outer portion being greater than the force required to move said flexible-seal member throughout said displacement range.

21. The improvement as set forth in claim 20 wherein said sliding-seal member and said flexible-seal member are arranged in parallel with one another.

22. In a fluid-powered actuator having a body and a rod, said body having a portion configured as a wall and provided with an opening therethrough, said rod having a penetrant portion passing through said wall opening and having an outer portion arranged on one side of said wall, the improvement which comprises:
a seal assembly for containing fluid leaking between said rod penetrant portion and said wall opening toward said wall one side, said seal assembly including
a sliding-seal member mounted on said rod outer portion for sealed sliding movement therealong,
a flexible-seal member having one end sealingly connected to said body and having another end sealingly connected to said sliding-seal member to form a variable-volume chamber to receive fluid leaking between said wall opening and said rod penetrant portion, and
biasing means for urging said sliding-seal member to move with said rod but permitting said sliding-seal member to move relative to said rod when the pressure in said chamber exceeds a predetermined pressure.

23. The improvement as set forth in claim 22 wherein said biasing means is a spring arranged to act between said body and said sliding-seal member.

24. The improvement as set forth in claim 22 wherein said biasing means are provided by frictional forces between said sliding-seal member and said rod outer portion.

* * * * *